US007983682B2

(12) United States Patent
Halkka et al.

(10) Patent No.: US 7,983,682 B2
(45) Date of Patent: Jul. 19, 2011

(54) CONTEXT BASED CONNECTIVITY FOR MOBILE DEVICES

(75) Inventors: Vesa Halkka, Helsinki (FI); Jussi E. Mäki, Espoo (FI)

(73) Assignee: Nokia Siemens Networks Oy, Espoo (FI)

( * ) Notice: Subject to any disclaimer, the term of this patent is extended or adjusted under 35 U.S.C. 154(b) by 526 days.

(21) Appl. No.: 11/576,476

(22) PCT Filed: Sep. 23, 2005

(86) PCT No.: PCT/IB2005/002820
§ 371 (c)(1),
(2), (4) Date: Oct. 15, 2008

(87) PCT Pub. No.: WO2006/048706
PCT Pub. Date: May 11, 2006

(65) Prior Publication Data
US 2009/0054068 A1 Feb. 26, 2009

(51) Int. Cl.
*H04W 40/00* (2009.01)
(52) U.S. Cl. ............ 455/445; 455/552.1; 455/414; 455/432.2; 370/338; 370/349
(58) Field of Classification Search .......... 455/445, 455/414, 432.2; 370/338, 349
See application file for complete search history.

(56) References Cited

U.S. PATENT DOCUMENTS

| 2003/0100308 | A1 | 5/2003 | Rusch |
| 2003/0119489 | A1* | 6/2003 | Mohammed ............... 455/414 |
| 2003/0163558 | A1 | 8/2003 | Cao et al. |
| 2004/0023652 | A1 | 2/2004 | Shah et al. |
| 2004/0077337 | A1* | 4/2004 | Vestergaard et al. ...... 455/414.1 |
| 2005/0036476 | A1* | 2/2005 | Eaton et al. ............... 370/349 |
| 2005/0272422 | A1* | 12/2005 | Asadi ........................ 455/432.2 |

FOREIGN PATENT DOCUMENTS

EP 1253796 A2 10/2002
WO 2004008693 A1 1/2004

OTHER PUBLICATIONS

Swedish International Search Report.

* cited by examiner

*Primary Examiner* — David Q Nguyen
(74) *Attorney, Agent, or Firm* — Squire, Sanders & Dempsey (US) LLP

(57) ABSTRACT

A system for automatically creating a preferred wireless connection medium order in a wireless communication device (WCD) for connecting to a network. A server on the network detects when a new device has entered a designated space, identifies the device, determines its capabilities and creates a wireless connection medium order for the device. The preferred connection medium order may be determined in view of a device profile corresponding to the WCD. The server may then set the preferred medium order in the WCD. The server may also control further information synchronization once the WCD is connected to the network.

17 Claims, 13 Drawing Sheets

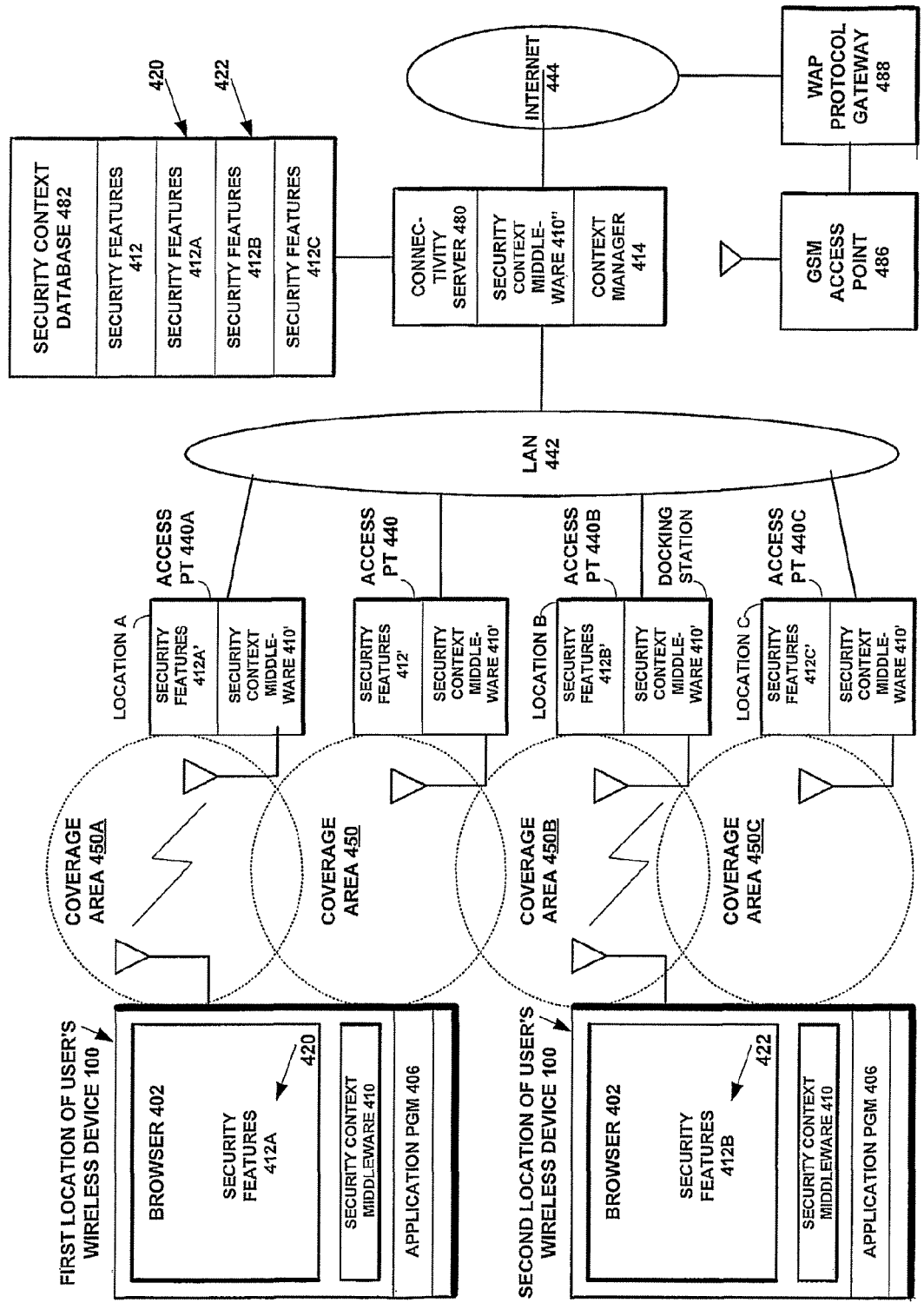

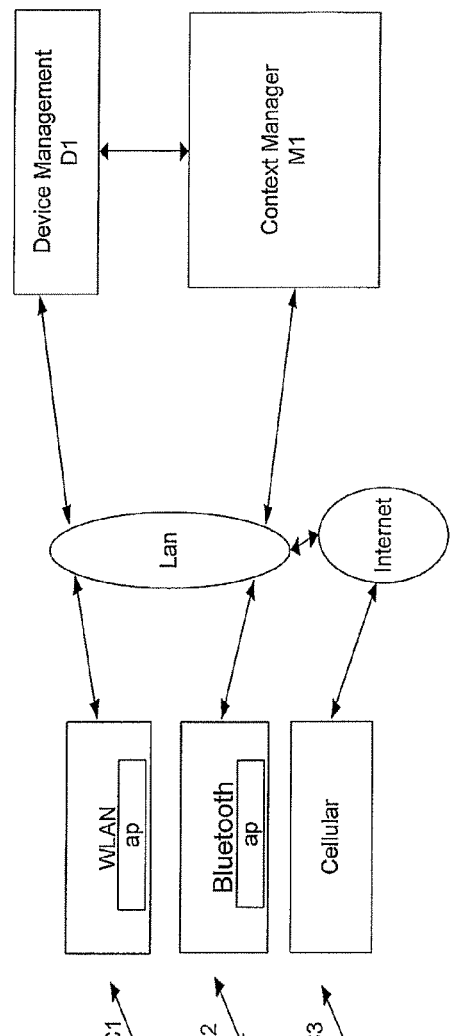
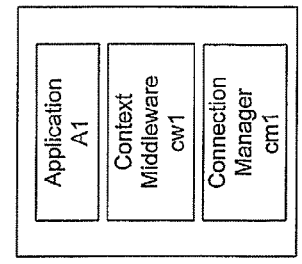
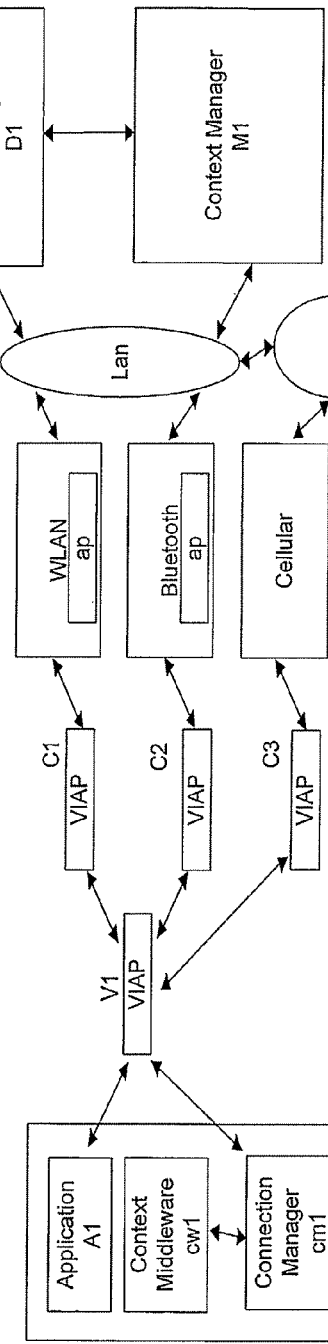
FIG. 4B
Contextually chosen network connection
Mobile device is in a location
That has multiple connections
C1 C2 C3 Available.
FIG. 4C
Context controlled virtual interface
Mobile device is in a location
That has multiple connections
C1 C2 C3 Available.

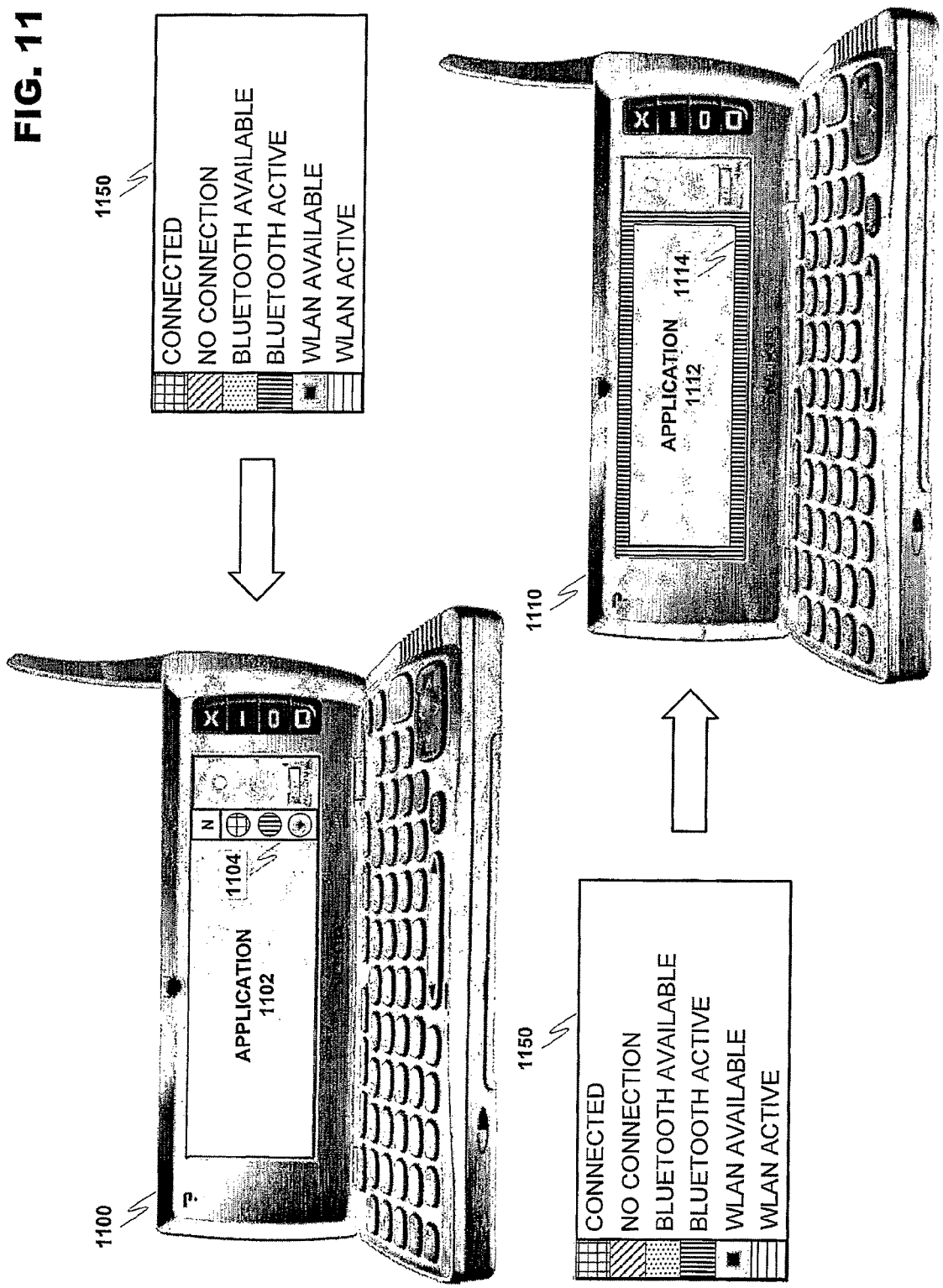

CONTEXT BASED CONNECTIVITY FOR MOBILE DEVICES

This international application claims priority to U.S. application Ser. No. 11/126,288, filed May 11, 2005, entitled, "Context Based Connectivity for Mobile Devices," which is a continuation-in-part of U.S. application Ser. No. 10/954,197, filed Oct. 1, 2004, entitled, "Method and System to Contextually Initiate Synchronization Services On Mobile Terminals In An Enterprise Environment" of which each of the entire specifications are incorporated herein by reference in their entirety.

BACKGROUND OF INVENTION

1. Field of Invention

The present invention relates to wireless communications. More particularly, the present invention relates to the automatic prioritization of available wireless communication mediums in a wireless communication device facilitated by an external server.

2. Description of Prior Art

A wireless communication device (WCD) may communicate over a multitude of networks. Cellular networks facilitate WCD communications over large geographic areas. For example, the Global System for Mobile Telecommunications (GSM) is a widely employed cellular network that communicates in the 900 MHZ-1.8 GHZ band in Europe and at 1.9 GHZ in the United States. This system provides a multitude of features including audio (voice), video and textual data communication. For example, the transmission of textual data may be achieved via the Short Messaging Service (SMS). SMS allows a WCD to transmit and receive text messages of up to 160 characters. It also provides data transfer to packet networks, ISDN and POTS users at 9.6 Kbps. While cellular networks like GSM provide a global means for transmitting and receiving data, due to cost, traffic and legislative concerns, a cellular network may not be appropriate for all data applications.

Bluetooth™ is a short-range wireless network technology quickly gaining acceptance in the marketplace. A Bluetooth™ enabled WCD may transmit and receive data at a rate of 720 Kbps within a range of 10 meters, and may transmit up to 100 meters with additional power boosting. A user does not manually instigate a Bluetooth™ wireless network. A plurality of devices within operating range of each other will automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master, and wait for an active slot to become available. These devices continually switch between various active communication and power saving modes in order to transmit data to other members of the piconet.

More recently, manufacturers have began to incorporate various devices for providing enhanced functionality in a WCD (e.g., components and software for performing close-proximity wireless information exchanges). Sensors and/or scanners may be used to read visual or electronic information into a device. A transaction may involve a user holding their WCD in proximity to a target, aiming their WCD at an object (e.g., to take a picture) or sweeping the device over a tag or document. Machine-readable technologies such as radio frequency identification (RFID), Infra-red (IR) communication, optical character recognition (OCR) and various other types of visual, electronic and magnetic scanning are used to quickly input desired information into the WCD without the need for manual entry by a user.

Worldwide, the use of WCDs has flourished due to the aforementioned increases in quality and functionality. These devices combine the ability to reliably receive, display, manipulate and relay various forms of information in a single compact package. These benefits have helped professionals create new business paradigms providing better and faster service, resulting in increased satisfaction for their customers without experiencing additional workload.

There are many examples of improvements in the workplace realized from the advent of wireless communications. At the lowest level, WCDs often replace walkie-talkies or CB radios for communication between employees. However, greater functionality in WCDs has led to additional applications. Workers may now use a WCD to review their calendar electronically, check product stock and/or current pricing, check project status, send email, receive visual or audio instructions related to job completion, track their progress by scanning job site tags or by taking digital pictures of their progress, relay status information back to a central information repository, etc. All of this can be done from one portable device, alleviating the need for inefficient paper handing.

While having business related information contained conveniently in a wireless communication device may aid productivity, its benefits are diminished if the data is not regularly updated. New applications, emails, meetings, announcements, instructions, price lists or other business related information must be current to be useful. Traditionally this information was synchronized with an external source when a user placed a device such as a Personal Digital Assistant (PDA) in wired communication with a computer (e.g., via a cable or device dock). As the technology developed, IR and/or RF communication allowed for wireless short-range manual synchronization. Finally, global wireless information providers such as cellular communication were employed to continually update a wireless communication device.

Despite these advances, problems still exist in the art. Cellular communication does allow for continuous Internet and/or remote WAN connections, however, there is also considerable expense and complexity involved in this architecture. Airtime charges from national cellular service providers and various governmental regulations have burdened this system with a large overhead cost. There is also the question of which cellular provider/technology to adopt, limiting the ability for a company to alter their strategy at a later time due to the expense of replacing contracts, equipment, etc.

Alternatively, short-range communication systems allow for flexible and cost-effective communication in publicly available frequencies. A company could establish short-range access points (e.g., employing Bluetooth™ or WLAN) providing coverage throughout their office building. An employee entering the building may have their device automatically connect to a wireless office network in order to update relevant information. Ideally, this would work fine at a small company with only one location and stable technology, but the problems multiply with the size of a business. A larger corporation might have many locations, all possibly employing different short range technologies at various revision levels. A WCD scanning for every possible short range communication configuration would quickly deplete its battery power, rendering the device useless. Traffic, security and configuration issues would necessitate the manual WCD configuration by the user, negating the benefits of the system.

What is needed is a technology that assists a wireless communication device to determine the appropriate short-range technology with which to communicate, without having the device continually search for all active networks. Upon entering an area including wireless information access points, the WCD should be informed what networks are available, and in what order it should attempt to connect to these networks so as to maximize its communication throughput while conserving battery power.

SUMMARY OF INVENTION

The present invention includes a method, apparatus, program and system for automating a preferred connection medium order in a WCD. A server on the network detects when a new device has entered a designated space, identifies the device, determines its capabilities and creates a connection medium order. The server then communicates with the WCD to set the preferred medium order.

In at least one exemplary embodiment, the WCD includes facilities for cellular communications enabling a location service. The location service determines the current location of the device with respect to various cellular base stations. The locator service has the ability to notify a server on a network when the device has entered a designated space, and may furnish the device identification to the server. The server may then analyze the characteristics of the device and determine the appropriate preferred connection settings.

In another exemplary embodiment, the WCD includes functionality supporting a Global Positioning System (GPS). When a WCD enters the designated space, the device is triggered to transmit its identification information to a server on the network. The server may then analyze the characteristics of the device and determine the appropriate preferred connection settings.

In a third exemplary embodiment, the WCD may contain machine-readable data, such as an RFID transponder. This device remains passive until scanned by an RFID sensor which may be located at an entrance to the designated space. When the transponder is scanned, it responds with the device identification information for the WCD. The server may then analyze the characteristics of the device and determine the appropriate preferred communication settings.

Additional features of the invention are not limited to control features that take the environment of the designated space into consideration in determining the preferred communication settings of the device. These factors include security issues, number of users actively communicating using a specific wireless system, environmental noise in the designated space, etc. The present invention may further control the synchronization of device data in the WCD with more recent data stored on the network based on these factors.

DESCRIPTION OF DRAWINGS

The invention will be further understood from the following detailed description of a preferred embodiment, taken in conjunction with appended drawings, in which:

FIG. 4A is a representation of a network diagram and connection scheme for connecting a wireless communication device to a context server in accordance with at least one embodiment of the present invention.

FIG. 4B is a representation of a contextually chosen network connections scheme in accordance with at least one embodiment of the present invention.

FIG. 4C is a representation of a context controlled virtual interface scheme in accordance with at least one embodiment of the present invention.

FIG. 11 discloses exemplary user interfaces for notifying the WCD user of connection status in accordance with at least one embodiment of the present invention.

DESCRIPTION OF PREFERRED EMBODIMENT

While the invention has been described in preferred embodiments, various changes can be made therein without departing from the spirit and scope of the invention, as described in the appended claims.

I. Operational Environment

Figure 1:
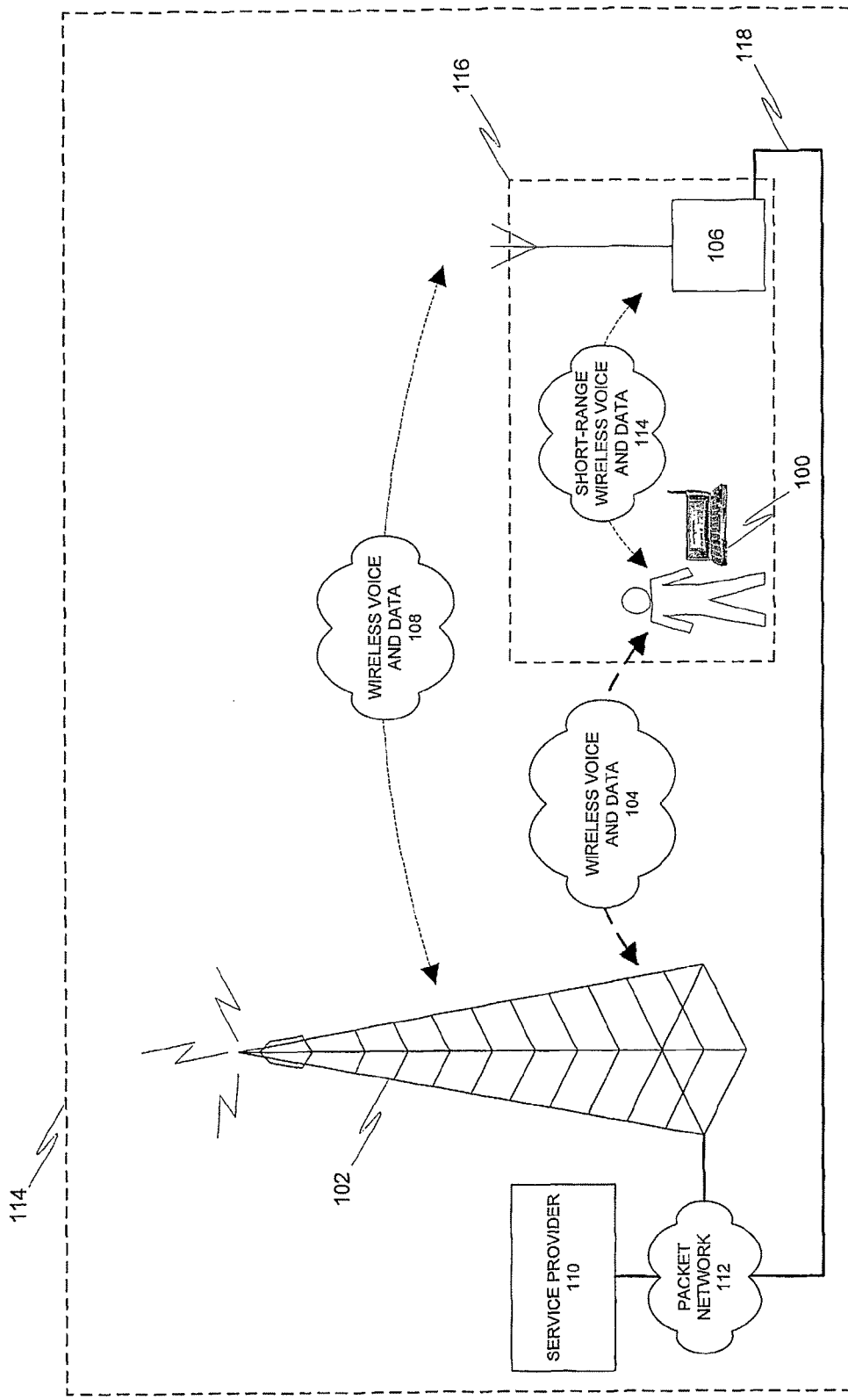
FIG. 1 is a representation of typical wireless communication networks and how these networks interact with a user having a wireless communication device.

Before describing the invention in detail, it may be helpful to describe an environment in which the invention may be used. Accordingly, FIG. 1 is a diagram of an exemplary operational environment in which WCD 100 may collect and consume services according to the techniques of the present invention.

WCD 100 is capable of engaging in various types of wireless communication. For instance, WCD 100 may engage in short-range communication 114, as well as long range cellular communication 104 (e.g., GSM). Examples of short-range communication are not limited to Bluetooth™, WLAN (i.e., IEEE 802.11), ultra wideband (UWB) and/or wireless USB transmission. As shown in FIG. 1, WCD 100 may enter within communication range of an access point 106. This communication range is defined by a coverage area 116, which determines the extent of the range at which these devices may communicate.

When WCD 100 is within coverage area 116 of access point 106, it may enter into a short-range communication connection with access point 106. Once this connection is established, access point 106 may provide information to WCD 100 regarding various available services. In a commercial setting, this information may include one or more links or shortcuts to such services. These links may be transmitted to WCD 100 in an arrangement or data structure that is referred to herein as a service bookmark. In a business environment, these services may also include applications to synchronize or update business information contained on the WCD.

WCD 100 is also capable of communicating by employing short-range scanning of a target object containing machine-readable data. For instance, RFID communications can be used to scan a target object located within, or in proximity to, an access point 106. For such communications, the target object may include a transponder, which provides data to WCD 100 in response to a scan performed by WCD 100. Such communications may occur at a very close proximity to the target object (e.g., almost touching). Accordingly, for RFID communications, coverage area 116 may span a few feet. Conversely, WCD 100 may also include a transponder which may be read by other close-proximity wireless devices with scanning capability.

Various service providers 110 provide the aforementioned services. In the environment of FIG. 1, WCD 100 communicates with service providers 110 across a backbone network 114. FIG. 1 shows that backbone network 114 includes a packet-based network 112 (e.g., the Internet) and a cellular network 102. Cellular network 102 may include base stations and a mobile switching center. However, these implementations are provided for purposes of illustration, In fact, other network types and arrangements are within the scope of the present invention.

Backbone network 114 is also used for the accumulation of links by access points 106. For instance, each service provider 110 may transmit information regarding its services to access point 106 via a high capacity wireless data network 108. Non-limiting examples of high capacity wireless data networks include unidirectional broadcast networks such as Digital Video Broadcast (DVB) used alone, or in combination with, a cellular network employing for example GPRS communication. Alternatively, an access point 106 may be connected to the packet network 112 via hardwire network connection 118. The information transmitted from the service provider 110 may include data (e.g., service bookmarks) to be collected by WCD 100. In addition, backbone network 114 may be used by WCD 100 to obtain further data from service providers 110 related to bookmark information received from access point 106.

II. Wireless Communication Device

Figure 2:
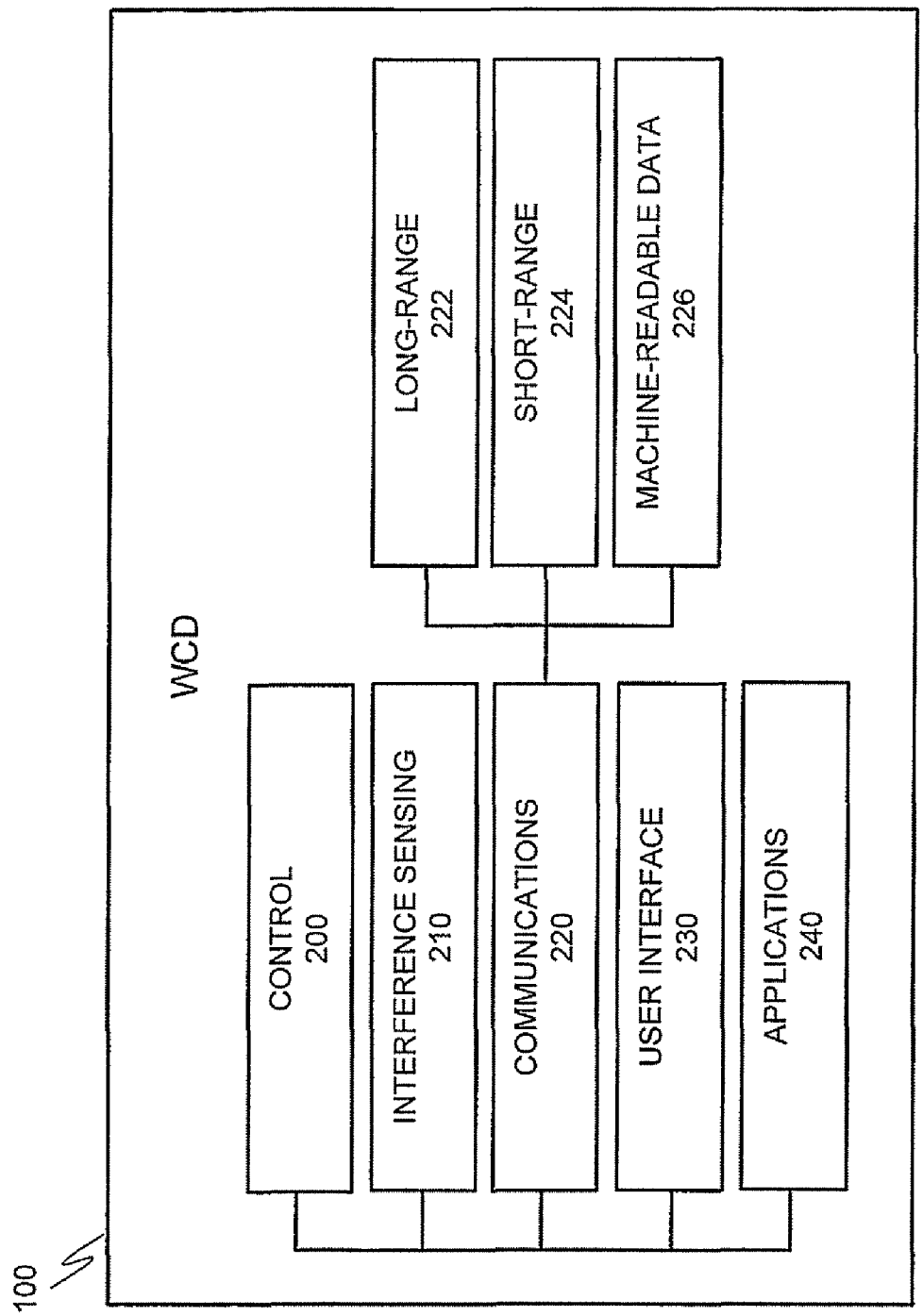
FIG. 2 is a modular representation of a wireless communication device usable in accordance with at least one embodiment of the present invention.

An exemplary modular layout for the wireless communication device is shown in FIG. 2. WCD 100 is broken down into modules representing the functional aspects of the device. These functions may be performed by various combinations of software and/or hardware components discussed below.

Control module 200 regulates the operation of the device. Inputs may be received from various other modules included within WCD 100. For example, interference sensing module 210 may use various techniques known in the art to sense sources of environmental interference within the effective transmission range of the wireless communication device. Control module 200 interprets these data inputs and in response may issue control commands to the other modules in WCD 100.

Communications module 220 incorporates all of the communications aspects of WCD 100. As shown in FIG. 2, communications module 220 includes for example long-range communications module 222, short-range communications module 224 and machine-readable data module 226. Communications module 220 utilizes at least these sub-modules to receive a multitude of different types of communication from both local and long distance sources, and to transmit data to recipient devices within the broadcast range of WCD 100. Communications module 220 may be triggered by control module 200 or by control resources local to the module responding to sensed messages, environmental influences and/or other devices in proximity to WCD 100.

User interface module 230 includes visual, audible and tactile elements which allow the user of WCD 100 to receive data from, and enter data into, the device. The data entered by the user may be interpreted by control module 200 to affect the behavior of WCD 100. User inputted data may also be transmitted by communications module 220 to other devices within effective transmission range. Other devices in transmission range may also send information to WCD 100 via communications module 220, and control module 200 may cause this information to be transferred to user interface module 230 for presentment to the user.

Applications module 240 incorporates all other hardware and/or software applications on WCD 100. These applications may include sensors, interfaces, utilities, interpreters, data applications, etc., and may be invoked by control module 200 to read information provided by the various modules and in turn supply information to requesting modules in WCD 100.

Figure 3:
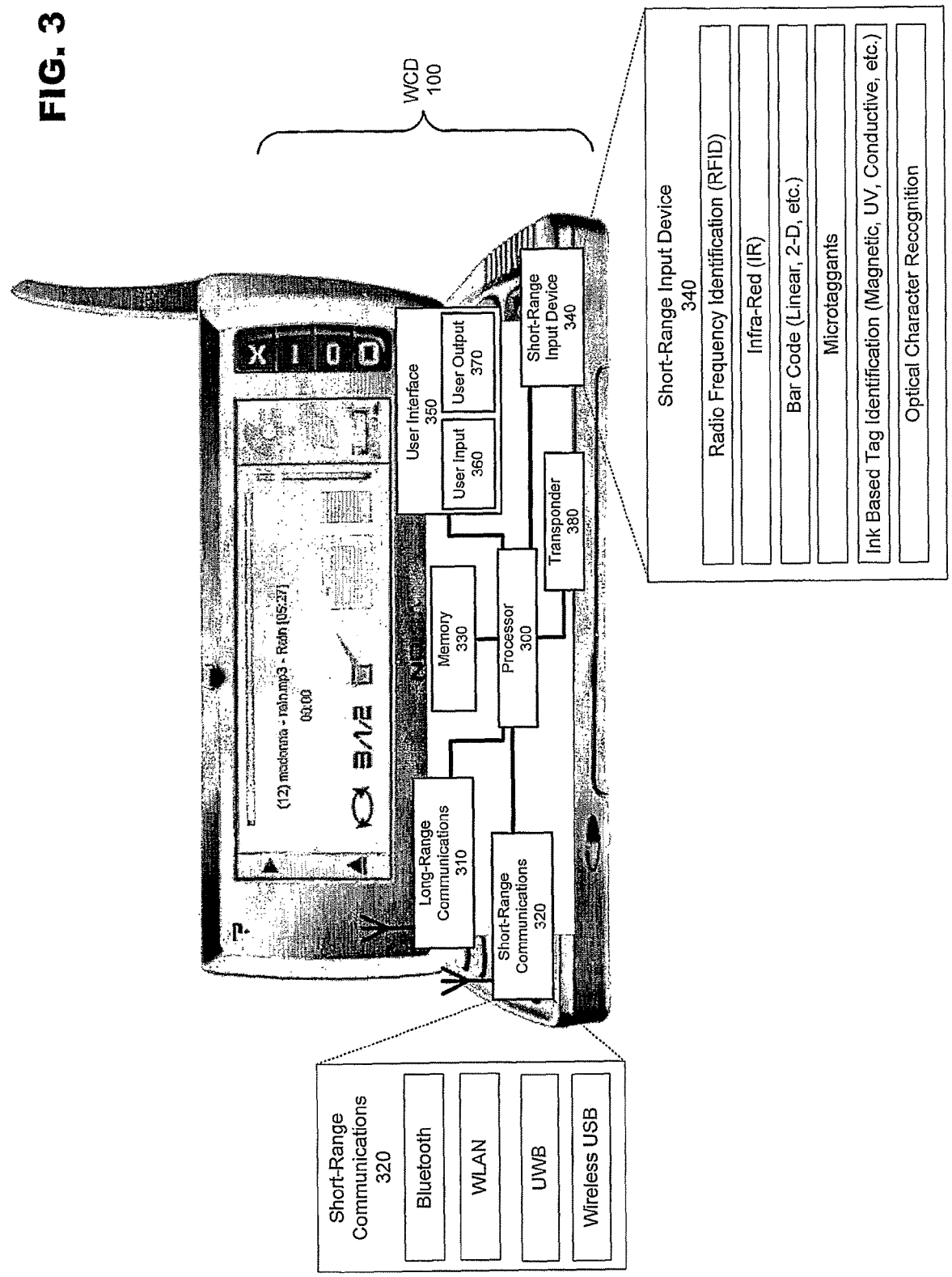
FIG. 3 is a functional representation of a wireless communication device usable in accordance with at least one embodiment of the present invention.

FIG. 3 discloses an exemplary structural layout of WCD 100 according to an embodiment of the present invention that may be used to implement the functionality of the modular system previously described. Processor 300 controls overall device operation. As shown in FIG. 3, processor 300 is coupled to communications sections 310, 320 and 340. Processor 300 may be implemented with one or more microprocessors that are each capable of executing software instructions stored in memory 330.

Memory 330 may include random access memory (RAM), read only memory (ROM), and/or flash memory, and stores information in the form of data and software components (also referred to herein as modules). The data stored by memory 330 may be associated with particular software components. In addition, this data may be associated with databases, such as a bookmark database or a business database for scheduling, email, etc.

The software components stored by memory 330 include instructions that can be executed by processor 300. Various types of software components may be stored in memory 330. For instance, memory 330 may store software components that control the operation of communication sections 310, 320 and 340. Memory 330 may also store software components including a firewall, a service guide manager, a bookmark database, user interface manager, and any communications utilities modules required to support WCD 100.

Long-range communications 310 performs functions related to the exchange of information across large coverage area networks (such as cellular networks) via an antenna. Therefore, long-range communications 310 may operate to establish data communications sessions, such as General Packet Radio Service (GPRS) sessions and/or Universal Mobile Telecommunications System (UMTS) sessions. Also, long-range communications 310 may operate to transmit and receive messages, such as short messaging service (SMS) messages and/or multimedia messaging service (MMS) messages.

Short-range communications 320 is responsible for functions involving the exchange of information across short-range wireless networks. As described above and depicted in FIG. 3, examples of such short-range communications 320 are not limited to Bluetooth™, WLAN, UWB and Wireless USB connections. Accordingly, short-range communications 320 performs functions related to the establishment of short-range connections, as well as processing related to the transmission and reception of information via such connections.

Short-range input device 340, also depicted in FIG. 3, may provide functionality related to the short-range scanning of machine-readable data. For example, processor 300 may control short-range input device 340 to generate RF signals for activating an RFID transponder, and may in turn control the reception of signals from an RFID transponder. Other short-range scanning methods for reading machine-readable data that may be supported by the short-range input device 340 are not limited to IR communications, linear and 2-D bar code readers (including processes related to interpreting UPC labels), and optical character recognition devices for reading magnetic, UV, conductive or other types of coded data that may be provided in a tag using suitable ink. In order for the short-range input device 340 to scan the aforementioned types of machine-readable data, the input device may include optical detectors, magnetic detectors, CCDs or other sensors known in the art for interpreting machine-readable information.

Further shown in FIG. 3, user interface 350 is also coupled to processor 300. User interface 350 facilitates the exchange of information with a user. FIG. 3 shows that user interface 350 includes a user input 360 and a user output 370. User input 360 may include one or more components that allow a user to input information. Examples of such components include keypads, touch screens, and microphones. User output 370 allows a user to receive information from the device. Thus, user output portion 370 may include various components, such as a display, Light emitting diodes (LED), tactile emitters and one or more audio speakers. Exemplary displays include liquid crystal displays (LCDs), and other video displays.

WCD 100 may also include a transponder 380. This is essentially a passive device which may be programmed by processor 300 with information to be delivered in response to a scan from an outside source. For example, an RFID scanner mounted in a entryway may continuously emit radio frequency waves. When a person with a device containing transponder 380 walks through the door, the transponder is energized and may respond with information identifying the device.

Hardware corresponding to communications sections 310, 320 and 340 provide for the transmission and reception of signals. Accordingly, these portions may include components (e.g., electronics) that perform functions, such as modulation, demodulation, amplification, and filtering. These portions may be locally controlled, or controlled by processor 300 in accordance with software communications components stored in memory 330.

The elements shown in FIG. 3 may be constituted and coupled according to various techniques in order to produce the functionality described in FIG. 2. One such technique involves coupling separate hardware components corresponding to processor 300, communications sections 310 and 320, memory 330, short-range input device 340, user interface 350, etc. through one or more bus interfaces. Alternatively, any and/or all of the individual components may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 350 may interact with a communications utilities software component, also contained in memory 330, which provides for the establishment of service sessions using long-range communications 310 and/or short-range communications 320. The communications utilities component may include various routines that allow the reception of services from remote devices according to mediums, such as the Wireless Application Medium (WAP).

When engaging in WAP communications with a remote server, the device functions as a WAP client. To provide this functionality, the software components may include WAP client software components, such as a Wireless Markup Language (WML) Browser, a WMLScript engine, a Push Subsystem, and a Wireless Medium Stack.

Applications (not shown) may interact with the WAP client software to provide a variety of communications services. Examples of such communications services include the reception of Internet-based content, such as headline news, exchange rates, sports results, stock quotes, weather forecasts, multilingual phrase dictionaries, shopping and dining information, local transit (e.g., bus, train, and/or subway) schedules, personal online calendars, and online travel and banking services.

The WAP-enabled device may access small files called decks which each include smaller pages called cards. Cards are small enough to fit into a small display area that is referred to herein as a microbrowser. The small size of the microbrowser and the small file sizes are suitable for accommodating low memory devices and low-bandwidth communications constraints imposed by wireless links.

Cards are written in the Wireless Markup Language (WML), which is specifically devised for small screens and one-hand navigation without a keyboard. WML is scaleable so that it is compatible with a wide range of displays that covers two-line text displays, as well as large LCD screens found on devices, such as smart phones, PDAs, and personal communicators. WML cards may include programs written in WMLScript, which is similar to JavaScript. However, through the elimination of several unnecessary functions found in these other scripting languages, WMLScript reduces memory and processing demands.

III. Operation of the Present Invention

FIG. 4A is a network diagram according to an embodiment of the present invention showing a plurality of wireless access points 440, 440A, 440B and 440C. The local area network (LAN) 442 interconnects the access points with the connectivity server 480 which in turn is connected to the security context database 482. The user's wireless device 100 is shown at a first location A near first wireless access point 440A, and then at a later time is shown at a second location B near a second wireless access point 440B. Each respective access point has a corresponding coverage area 450, 450A, 450B, 450C, respectively. Bluetooth wireless devices have typical coverage area of a radius of 10 meters. IEEE 802.11 Wireless LAN devices and HIPERLAN Wireless LAN devices have a typical coverage area with a radius of 100 meters. A user's wireless device 100 in FIG. 1 includes the microbrowser 402, a key pad, and an application program 406. Also included, in the user's wireless device is security context middleware 410. Each access point 440, 440A, 440B and 440C includes security context middleware 410'. The connectivity server 480 includes a security context middleware 410". The connectivity server 480 further includes the context manager 414. The connectivity server 480 is also connected to the internet 444 which is connected in turn to the WAP protocol gateway 488 which in turn is connected to the GSM access point 486.

In this example, the security context middleware 410 stored in a memory of the user's wireless device 100, has a plurality of security process subroutines which are selectable by a security processing middleware command issued by the context manager 414. Further in accordance with the invention, the context manager program 414 in the connectivity server 480 determines a context for the user's wireless mobile device 100 from a signal received from one of the access points 440, 440A, B, C indicating that the wireless mobile device is wirelessly connected to that access point. The security context database 482 connected to the connectivity server 480 stores security feature data which is accessible by the determined context from the connectivity server 480, to implement a security process. The context manager 414 accesses the stored security feature data in the security context database 482 based on the determined context of the user's wireless device 100 in the vicinity of the access points 440, 440A, 440B or 440C. The context manager 414 then sends the security processing middleware command representing the security feature data to the security context middleware program 410" in the connectivity server 480, the security context middleware program 410' in the access point connected to the user's wireless device 100, and to the security context middleware 410 in the user's wireless device 100. The security processing middleware command then invokes the security process in the addressed subroutine in the wireless mobile device, in the access point and in the connectivity server 480.

FIGS. 4B and 4C describe two similar connection control schemes for a wireless communication device according to embodiments of the present invention. Both of these control schemes may be employed in the present invention.

In FIG. 4B, three wireless connection types C1-C3 are available. Application (A1), Context Middleware (cw1) and connection manager (cm1) reside in the WCD. Connections C1-C3 are WLAN, Bluetooth™ and Cellular connections respectively. C1 and C2 may alternatively be any type of wireless short range connection networks. C1 and C2 are provided by one or more access points (ap) which may be connected to a company's local area network (LAN). The Context Manager (M1) and Device Management (D1) reside in a server also on the LAN or on a WAN. Cellular connection C3 may provide Internet communication (e.g., via GPRS) which may eventually be connected to the company's LAN through an internet service provider.

In this architecture, cw1 utilizes the cm1 to control which connections C1-C3 are used by the application layer. M1 prioritizes these connections for the cm1 in order to provide an optimized connection order based on a multitude of factors. M1 determines the optimum connection medium order by determining the capabilities of the WCD from records stored in D1. D1 may provide a profile of a device including supported connection methods, hardware, software revisions, permissions, etc. M1 considers this information, possibly in conjunction with environmental information and other contextual information, such as time, location, user profile, etc. related to the designated area, and forwards a prioritized connection scheme to the WCD. FIG. 4A further discloses that ow1 may establish connections between various applications on the WCD and C1-C3 by configuring the WCD at the application level as well as the device level. This means that one application may be configured (within the application itself) to use one connection while another application may be configured to user another connection. Otherwise, an application may use a default connection defined at the device level. While this connection scheme is functional, it is also somewhat complex due to the need to configure each application independently each time a communication method changes.

FIG. 4C uses a similar scheme, but interdicts a Virtual Internet Access Point (VIAP) instead of requiring the custom configuration of communications at the application level. This virtual connection is still controlled by cm1 under direction of the cw1 and ultimately M1. However, because a single virtual interface is presented to the WCD (e.g. one access link in a User Interface of the WCD, or any application User Interface in the WCD, instead of connections C1, C2 or C3) connections do not have to be constantly monitored and altered at the application level. The VIAP directs all communication to and from the appropriate applications without having to reconfigure the connection features each time a preferred connection is changed. The VIAP streamlines the operation of the WCD by requiring changes only be made to the VIAP behavior, not each individual application. In this embodiment the M1 manages or determines a preferred access method/point of the WCD or applications in the WCD, i.e. the content of the VIAP. When a user selects accessing a network form the WCD or any application in the WCD a network connection/access is established via the VIAP that further activates C1, C2 or C3.

Figure 5:
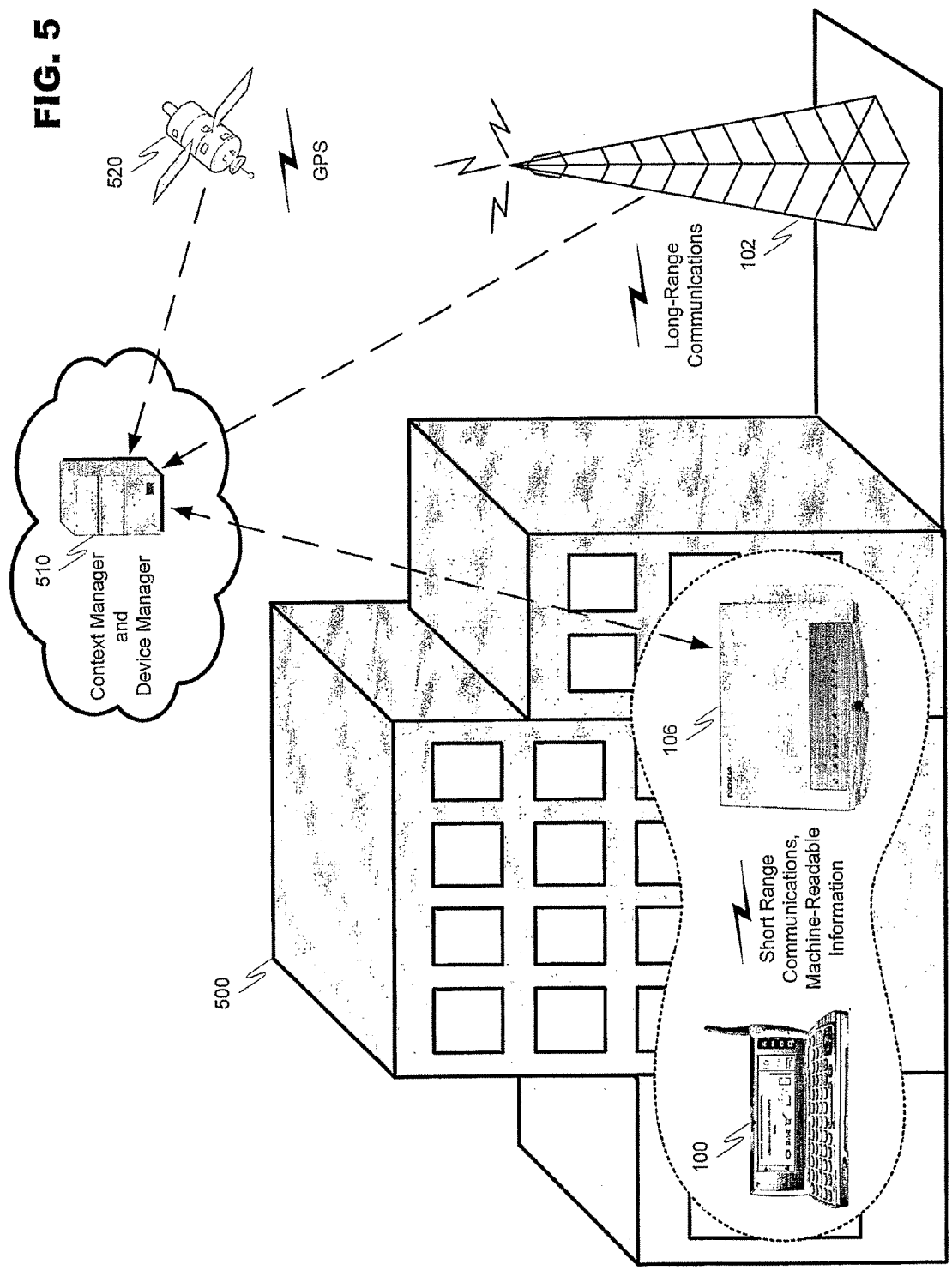
FIG. 5 is an exemplary representation of a server receiving the positional information of a wireless communication device in accordance with various embodiments of the present invention.

The connection schemes of FIG. 4A-C are now employed in the system of the invention in FIG. 5, describing one embodiment of the invention. Designated space 500 is an office building in this example. Context Manager (M1) and Device Manager (D1) are housed in server 510. Server 510 may be located in designated space 500 or may be remotely located and accessible via a wide area network (WAN). M1 may be alerted to the presence of WCD 100 in designated space 500 via a multitude of methods. In one embodiment, long-range communications 102 includes a locator service. This service reports the location of a cell phone by determining which base station of a cellular network 102 the cellular device is currently using. This service may report the location of the WCD to M1 when the person (and WCD 200) enters, or is in close proximity to, the designated space. A second embodiment uses global positioning to determine the position of WCD 100. A satellite 520 may be used to continually relay geographic coordinates to WCD 100. The device may then report these coordinates to M1 periodically, when WCD 100 enters the designated space 500, when WCD locates a designated machine-readable tag or access point, etc. In a third embodiment, WCD 100 may communicate its presence inside the designated space 500 via short-range communication or via machine-readable data. For example, the device may report identification information to a Bluetooth™ or WLAN access point encountered in the designated space. Alternatively, WCD 100 may pass near a machine-readable data scanner (e.g., an RFID scanner) when a user enters the designated space 500. The scanner would activate transponder 380 in WCD 100, prompting a response to the machine-readable data scanner that includes device identification information.

Figure 6:
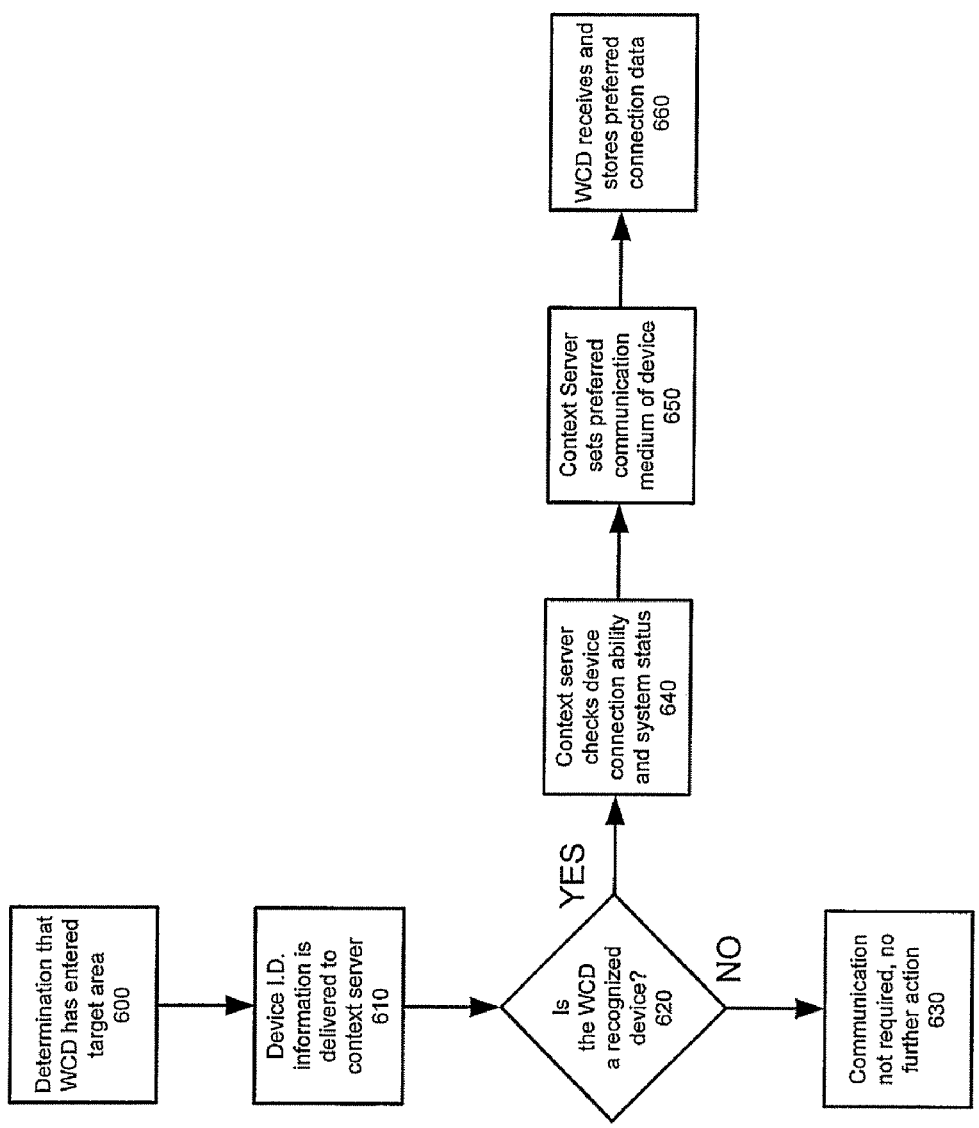
FIG. 6 is flow chart describing a connection process of at least one embodiment of the present invention.

A flow chart of the basic functionality of the invention is depicted in FIG. 6, describing one embodiment of the invention. In step 600, a determination is made that WCD has entered designated space. This determination may occur using one of the aforementioned methods. Regardless of the method of procurement, the identification information of the WCD is delivered to the context server in step 610. The server then takes this information and determines whether the WCD is a recognized device (step 620). The determination may involve the context server contacting a device management database. Device management includes information that may be queried in order to determine whether the WCD is registered with the system and whether a device profile exists for the WCD. The device profile may include, but is not limited to, user information, device type, connection mediums supported by the device, revisions of various device drivers, access permissions for the device, date and time since last synchronization with the network, etc. If a device profile is not located, then the WCD is deemed not to be a member or target device and no further communication is necessary. If the device ID and profile are located, the system proceeds to step 640. The context server then considers the connection mediums available on the WCD, possibly in conjunction with the status of the communication environment in the designated space. In regard to the WCD, the context server may consider, the device type, device identity, user identity, time and task to be executed, etc. With respect to the network, the context server may consider the current relative speed of each type of connection, the reliability (e.g., number of failures, lost packets, etc.) of each type of connection, number of users in the designated space currently using each type of connection, the relative security of each type of connection, the environmental noise in the designated space that may result in interference with each type of connection, cost of connection, etc. The server may then combine these factors to produce a connection priority list including preferred connection networks/access points for different applications and/or for the device, or simply one preferred connection network/access point for the device and its applications. In step 650, the server pushes/transmits this list or the preferred connection network information back down to the WCD using short-range communications provided between the WCD and, for example, an access point. The WCD may then use this list or the preferred connection network information to determine the preferred connection medium for the designated space. In step 660, the WCD stores this list or the preferred connection information in a memory 330 on the WCD. This information is them used by applications, context middleware [cw1] and/or connection manager [cm1] to create access to a preferred network.

Figure 6A:
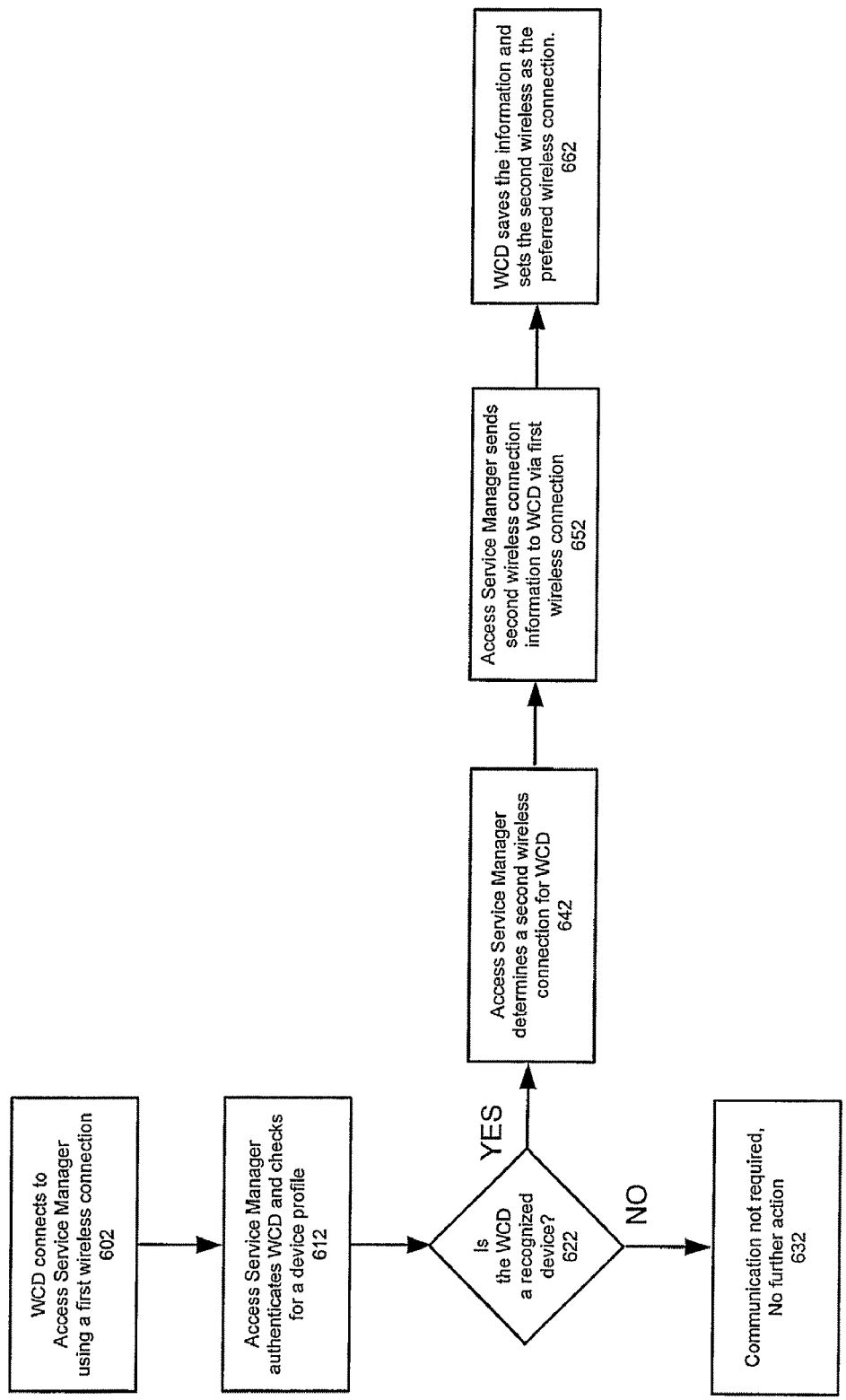
FIG. 6A is flow chart describing an alternative connection process of at least one embodiment of the present invention.

FIG. 6A is a flowchart laying out the process for another embodiment of the present invention. In step 602, the WCD connects to an Access Service Manager using a first wireless connection. The wireless connection may be any of the type already described, but preferably is a Bluetooth™ or WLAN connection through a local access point. The Access Service Manager then checks a database (e.g., within a Device Manager) to find the device identification and a device profile (steps 612 and 622). If no match can be found, then in step 632 no further action is taken by the Access Service Manager. If a profile is found, the Access Service Manager proceeds to evaluate the connection capabilities of the WCD, possibly in conjunction with the characteristics of the designed space and other relevant context information, in order to determine a preferred wireless connection (step 642). In step 652, the Access Service Manager sends second wireless connection information back to the WCD via the first wireless connection. The WCD then saves this information and sets the second wireless connection information as the preferred connection (step 662).

Figure 7:
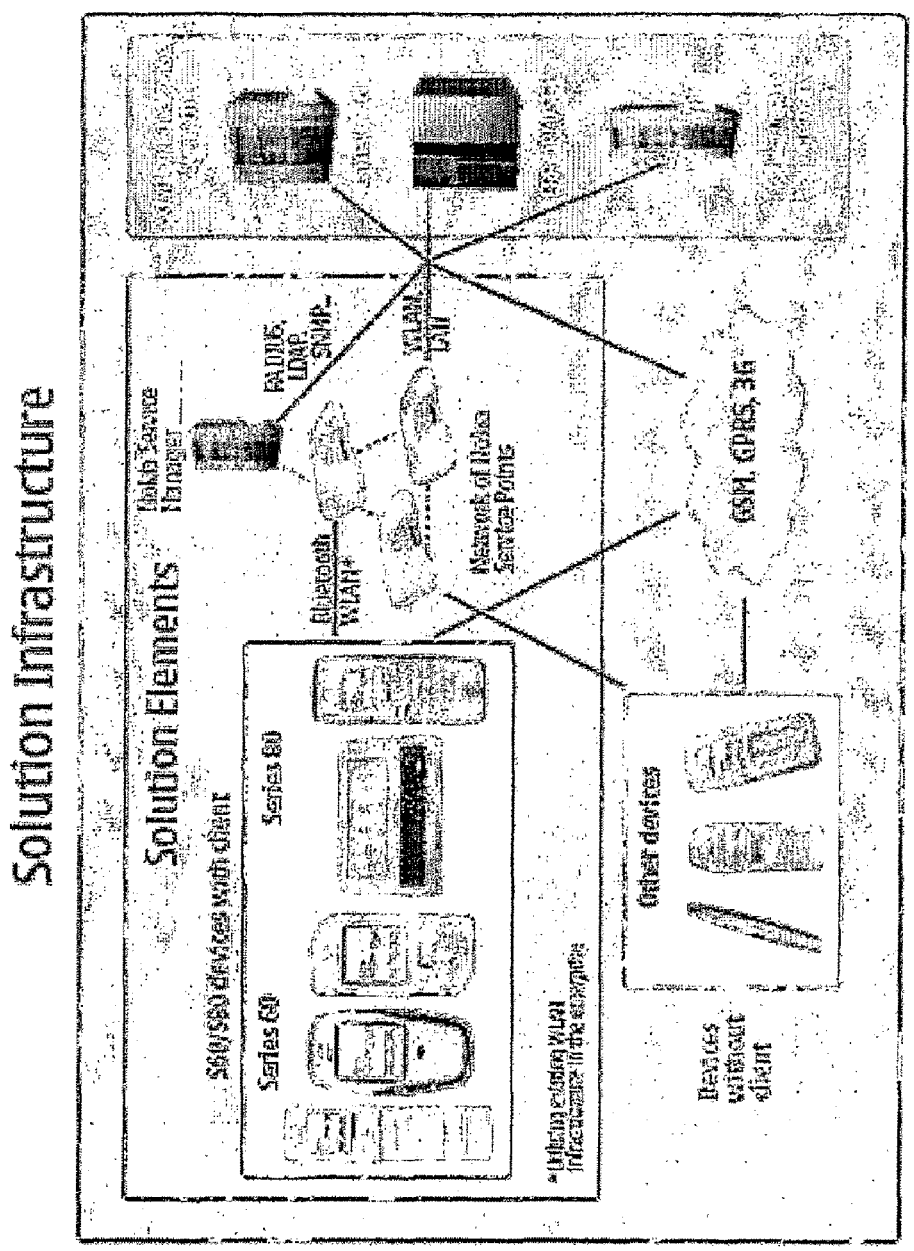
FIG. 7 demonstrates a more specific application of at least one embodiment of the present invention.

FIG. 7, describing one embodiment of the invention, illustrates a specific application of the instant invention. Here multiple types of WCD are indicated as communicating via short-range communication including Bluetooth™ and WLAN to one or more access points. These access points are also connected via hardwire LAN, WLAN or WAN to various information servers or applications described as part D1 in the FIGS. 4 and 5. At least one of these servers may deal with device management. Other servers may provide employee specific information updates and checks related to email and personal information management (PIM) including calendar, scheduling, virus protection system, etc. Still other servers may provide global business information such as enterprise resource planning (ERP) including product planning, manufacturing, sales and marketing, as well as customer relationship management (CRM) and other relevant information. Some devices only have rudimentary communication and data handling capabilities (e.g., cellular telephones). These devices may connect to the network using cellular mediums such as GSM, GPRS, 3G, etc.

Figure 8:
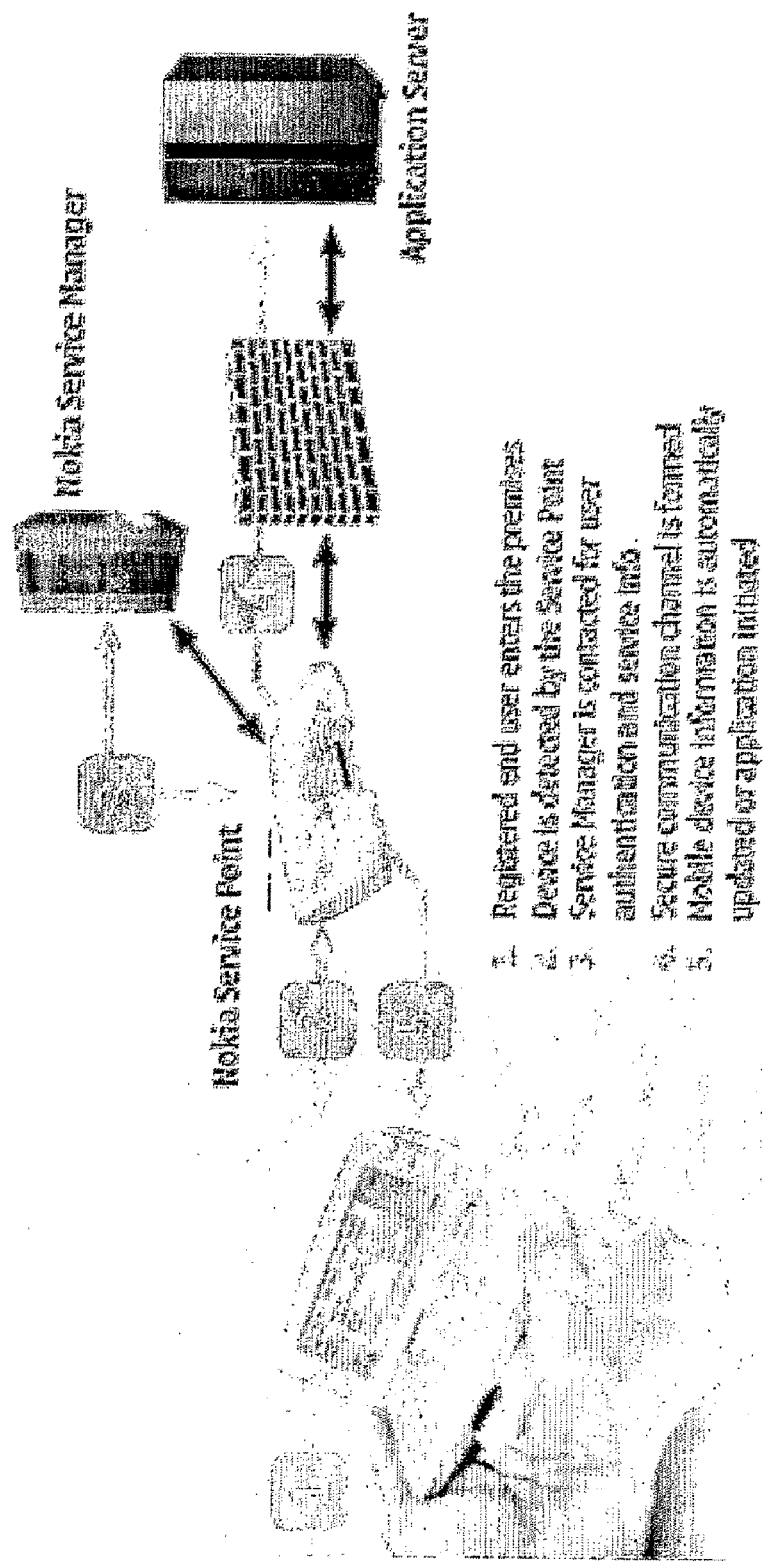
FIG. 8 demonstrates exemplary connection steps related to the more specific application disclosed in FIG. 7.

FIG. 8, describing one embodiment of the invention, discloses the actual connection established by a user (e.g., an employee) according the specific application described in FIG. 7. In step one a user enters the premises. Provided that the WCD is capable of communicating via short-range communication, a service point automatically detects the WCD when the user walks within its effective transmission range. The service point then forwards the device's identification information to a service manager to request authentication and service information for the WCD. If the Service Manager recognizes the device, a secured connection is formed between the device and the network. Update information relevant to the user of the device may then be downloaded onto the WCD.

In other embodiment, when the Service Manager has authenticated the WCD and a preferred connection network/access point information is transferred to the WCD, a connection is created with the Service Manager that may then access (with API) information in any application or server D1 in the network that recognizes and authenticates the device. The application or server D1 may then initiate communication between the WCD and may perform various actions, such as PIM, back-up service, database synchronization, etc.

Figure 9:
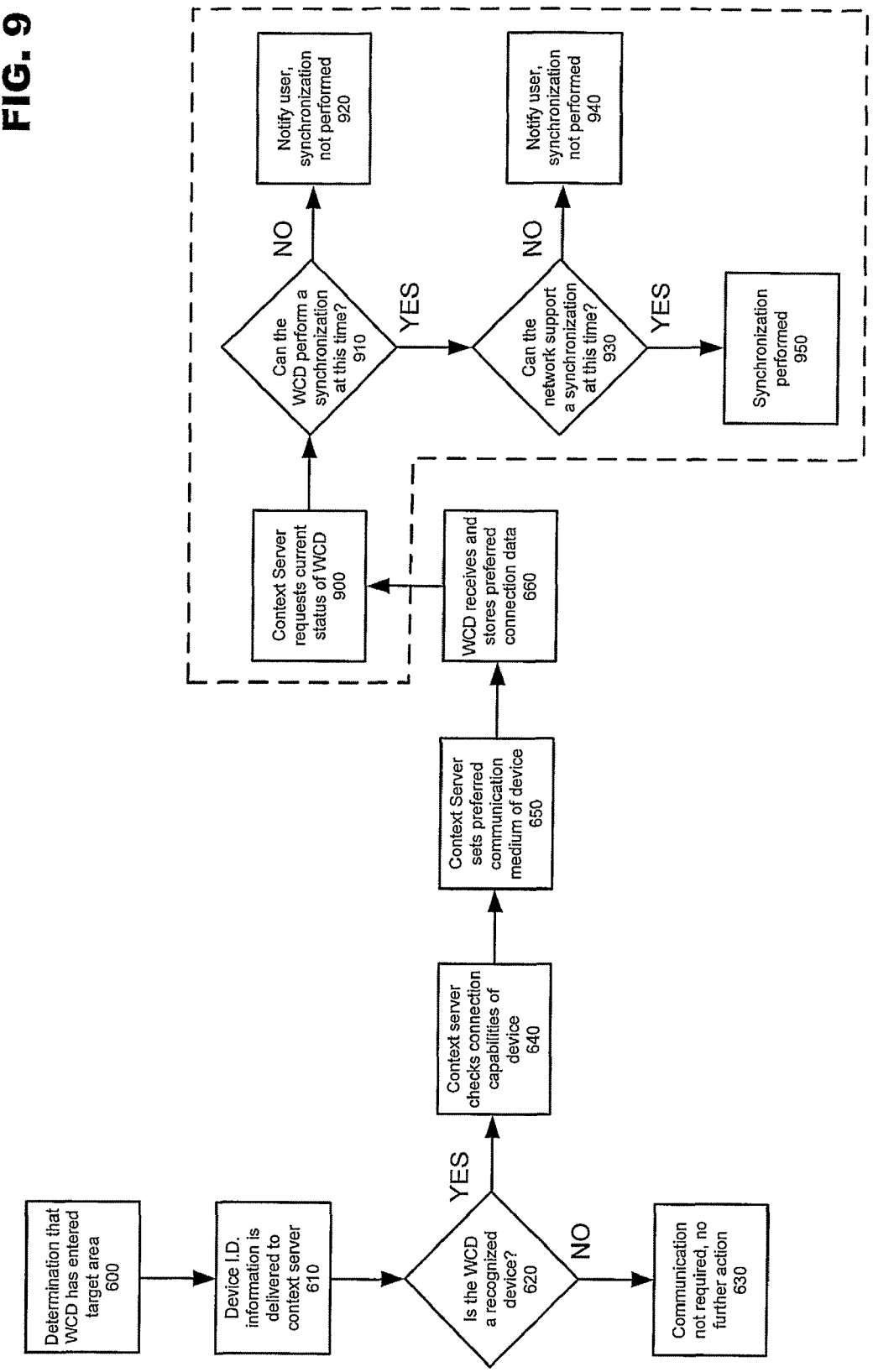
FIG. 9 is flow chart describing an exemplary operational process of the more specific application disclosed in FIG. 7.

A flowchart embodying the specific application of FIGS. 7 and 8 is disclosed in FIG. 9, describing one embodiment of the invention. Steps 600 to 660 include the basic connection scheme of the present invention and is identical to the flowchart of FIG. 6. Step 900 begins after the context server has delivered the connection priority list to the WCD and the device has used this information to connect to the system. The context server may then request the current status of the WCD. The device may reply with information including time of operation, battery level, running applications, available memory, last update time and date, etc. The server can then make a judgment as to whether the WCD is able to perform synchronization at this time (step 910). If the WCD is too low on resources, the context server may notify the user in step 920 that a synchronization may not be performed until the user frees up memory, recharges the device, etc. If the device is in a permissible state, the server then proceeds to step 930 where it questions whether the network status will permit the WCD to synchronize its required information. In making this determination, the server may consider the network traffic on each type of connection, the status of various databases and/or applications, time of day, etc. This may be important near the beginning of a work day when the arrival of many workers in a short time period would otherwise overload the network/servers. The server may schedule devices for update in a fashion as to optimize synchronization while not overloading the system. If the network is not available for synchronization, the server may notify the user that synchronization may be delayed and may also schedule the WCD for update at a later time. Otherwise, if the network is prepared for the update, the update may be performed in step 950.

Figure 10:
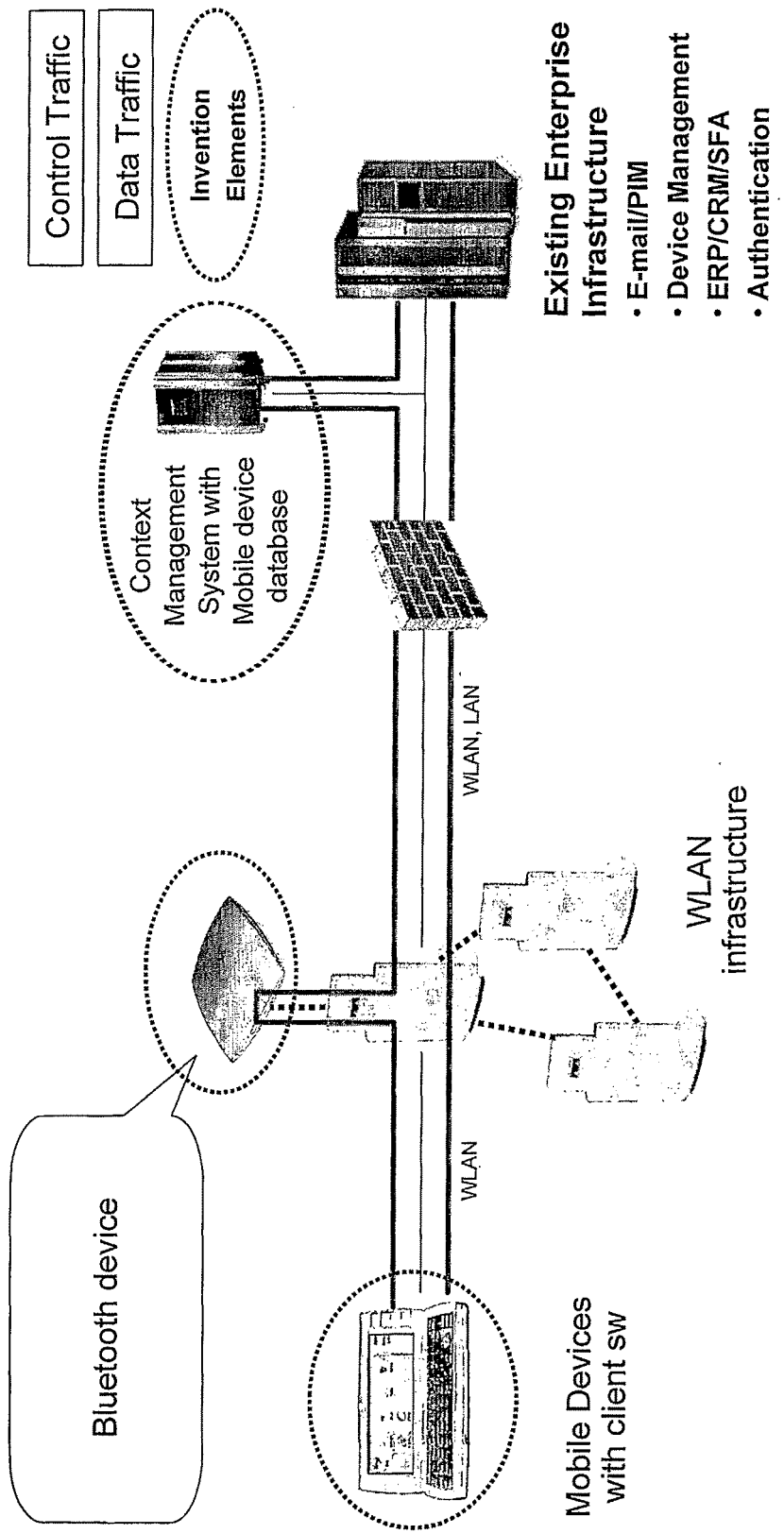
FIG. 10 discloses an alternative application in accordance with at least one embodiment of the present invention.

FIG. 10 discloses another embodiment of the invention. Here a WCD is accessed by an access point when a user enters a designated space (e.g., an office building). The local access points communicate with the WCD and establish a connection to a context management server. The server not only assigns a preferred connection to the WCD, but also has the capability to automatically start and manage applications on the WCD without the need for manual intervention by the user. The server may evaluate the contents of the WCD, and may determine what information needs to be updated. This judgment may also include an estimation for the time and or energy required to perform the update, and whether the resources in both the WCD and on the network are sufficient to perform the update. If all resources are sufficient, the server automatically initiates the synchronization and updating of the WCD.

Further, WCD 100 may use a backup service that takes regular backups. When user enters the designated space, the device has Bluetooth™ on, but WLAN off. Context is defined as (device id, device location, user id, time, and other definable items like scheduled tasks) in a database. A scheduled full backup has been already triggered, and backup system is ready for the task. When a mobile device arrives to a location that has good connectivity, a server notices it. The server turns on a WLAN connection on WCD 100 and optionally starts a wireless device backup client and notifies a backup service about WCD 100. This notification includes connectivity information, like device IP address in WLAN, and any device specific information that is needed for the backup system to recognize the task: at least user identity and device specific information like device type and hw/sw version numbers, device serial number, IMEI, IMSI. This can be further enhanced with server usual context behavior learning: full backups can be taken during lunch hours or regular meetings or even at home during nights, whenever the device is idle in a good connectivity location. Incremental backups are normally taken in the good network situations like the full backup. If this fails for a certain threshold time, incremental backups can be triggered in another context that has worse connectivity. Also amount of items to be backed up can be dynamically configured based on context.

In another embodiment of the invention, the preferred communication network/access point may be IP based uni-directional, multicasting or broadcasting network, such as DVB-H. Additionally, the WCD needs to have appropriate receiving means.

In another embodiment of the invention, the context/service manager M1 (510) is included in the access point 106.

FIG. 11 discloses two exemplary user interfaces in accordance with at least one embodiment of the present invention. Examples 1100 and 1110 are two non-limiting user interface configurations that may be incorporated within the present invention to express communication connection status to a user. Example 1100 shows a user interface including application area 1102 and network connection indicator 1104. Legend 1150 shows different color and/or patterns indicative of communication states. Indicator 1104 is in a "stoplight" configuration, with "lights" representing various communication states. In this example, connection indicator 1104 discloses that the WCD is currently connected to a network, that the Bluetooth™ connection is active, and that there is also an available WLAN network in communication range. The vertical order of the lights in indicator 1104 may, in some embodiments, also represent the preferred connection information as dictated by the context server. An alternative example of a user interface displaying communication status is shown in 1110. Here application window 1112 has a border 1114 that is keyed to the same legend 1150 as in the previous example. The color and/or pattern of the border indicates the communication status of the WCD. In this example, flashing the border may also indicate that a connection has been broken, or that another preferred communication medium has been established. Different combinations of colors, patterns and/or sounds may also be included in various parts of the user interface (e.g., border, background, etc.) to convey communication status of a WCD to a user.

The present invention is an improvement over the prior art. The invention provides the ability for a wireless communication device to automatically be provided with an optimized connection list when multiple connection options are available. The server providing the list may take into account both the status of the WCD as well as the status of the network when creating the list. In a specific application of the invention, once the device is connected, the server may further determine the status of both the device and the network before initiating a synchronization with the device. All of these decision measures ensure that the requirements of both the network and the wireless communication device are considered before beginning an information exchange that may proceed to completion due to limitations in the device, the network or both. In this way, information may constantly be updated in an efficient manner on a wireless communication device without the need for any manual user intervention.

Accordingly, it will be apparent to persons skilled in the relevant art that various changes in form and detail can be made therein without departing from the spirit and scope of the invention. The breadth and scope of the present invention should not be limited by any of the above-described exemplary embodiments, but should be defined only in accordance with the following claims and their equivalents.

The invention claimed is:
1. A wireless communication device, comprising:
    a communication interface configured to access at least one wireless communication medium;
    a processor, coupled to at least the communication interface, the processor being configured to set a preferred wireless communication medium in the wireless communication device; and
    a user interface, coupled to at least the processor,
    wherein the user interface comprises at least a display, the display being configured to display at least information related to the communication connection state of the wireless communication device to the user, wherein the information related to the communication connection state of the wireless communication device is displayed by at least one of colors and patterns in a stable or flashing state, and wherein the colors and patterns are displayed in at least one of a stoplight-type indicator, a window border and a background.
2. The wireless communication device of claim 1, wherein the wireless communication medium is a short-range wireless communication medium comprising at least one of a Bluetooth™. Network, a Wireless Local Area Network (WLAN), or an Ultra Wide Band Network (UWB), or a long-range wireless communication medium comprising at least one of Global System for Mobile Communications (GSM), General Packet Radio Service (GPRS), Universal Mobile Telecommunications System (UMTS), Multimedia Messaging Service (MMS) or Short Messaging Service (SMS).
3. The wireless communication device of claim 1, wherein the preferred wireless communication medium is a short-range wireless communication medium comprising at least one of a Bluetooth™. Network, a Wireless Local Area Network (WLAN) or an Ultra Wide Band Network (UWB), or a long-range wireless communication medium comprising at least one of Global System for Mobile Communications (GSM), General Packet Radio Service (GPRS), Universal

Mobile Telecommunications System (UMTS), Multimedia Messaging Service (MMS) or Short Messaging Service (SMS).

4. The wireless communication device of claim 1, wherein the processor is further configured to receive information from the server regarding whether a synchronization may occur for the wireless communication device by evaluating the status of the wireless communication device and the status of the network.

5. The wireless communication device of claim 1, wherein the processor is configured to provide identification information of the wireless communication device to a server as is further configured to set the preferred wireless communication medium as suggested by the server.

6. The wireless communication device of claim 1, further comprising machine-readable media, the machine-readable media configured to respond with identification information of the wireless communication device when it is read by a scanner.

7. The wireless communication device of claim 6, wherein machine-readable media comprises information provided by at least one of Radio Frequency Identification (RFID) communication, Infra-Red communication (IR), Bar Code Reader (BCR) communication including processes related to interpreting UPC labels, Optical Character Recognition (OCR) communication or Magnetic Ink Character Recognition (MICR) communication.

8. The wireless communication device of claim 1, wherein the wireless communication device further comprises location-determining functionality configured to trigger the processor to send identification information of the wireless communication device to the server when the wireless communication device enters a designated area.

9. The wireless communication device of claim 8, wherein the location-determining functionality is configured to determine location via at least one of a global positioning system (GPS) or with respect to at least one access point of a wireless communicating system.

10. A method, comprising:
accessing at least one wireless communication media using a wireless communication device;
setting a preferred wireless communication media in the wireless communication device;
displaying information related to the preferred wireless communication media on the wireless communication device, wherein displaying information related to the preferred wireless communication media further comprises displaying at least information related to the communication connection state of the wireless communication device on a user interface of the wireless communication device; and
using at least one of colors and patterns in a stable or flashing state to display the communication connection state of the wireless communication device and displaying colors in at least one of a stoplight-type indicator, a window border and a background.

11. The method of claim 10, further comprising:
providing identification information from the wireless communication device to a server via the wireless communication media.

12. The method of claim 10, further comprising responding with identification information when a machine-readable media of the wireless communication device is read by a scanner.

13. The method of claim 12, wherein machine-readable data includes information provided by at least one of Radio Frequency Identification (RFID) communication, Infra-Red communication (IR), Bar Code Reader (BCR) communication including processes related to interpreting UPC labels, Optical Character Recognition (OCR) communication or Magnetic Ink Character Recognition (MICR) communication.

14. The method of claim 10, further comprising providing identification information to a server when the wireless communication device enters a designated area.

15. The method of claim 10, further comprising receiving information from the server regarding whether synchronization may occur for the wireless communication.

16. A computer program product comprising a computer usable medium having computer readable program code embodied in said medium, comprising:
a computer readable program configured to access at least one wireless communication media using a wireless communication device;
a computer readable program configured to set a preferred wireless communication media in the wireless communication device;
a computer readable program configured to display information related to the preferred wireless communication media on the wireless communication device; and
a computer readable program configured to display at least information related to the communication connection state of the wireless communication device to the user, wherein the information related to the communication connection state of the wireless communication device is displayed by at least one of colors and patterns in a stable or flashing state, and wherein the colors and patterns are displayed in at least one of a stoplight-type indicator, a window border and a background.

17. A communication system, comprising:
a wireless communication device;
an access point configured to communicate with the wireless communication device; and
a server, coupled to the access point, configured to obtain identification information of the wireless communication device and to determine at least one preferred wireless communication medium for connecting the wireless communication device to a network;
the server further configured to transmit information to the wireless communication device via the access point regarding the at least one preferred wireless communication medium for connecting to the network;
the wireless communication device configured to provide the identification information to the server, to set the at least one preferred wireless communication medium as the preferred communication medium for connecting the wireless communication device to the network, and to display information related to the preferred wireless communication medium on a user interface in the wireless communication device and to display at least information related to the communication connection state of the wireless communication device to the user, wherein the information related to the communication connection state of the wireless communication device is displayed by at least one of colors and patterns in a stable or flashing state, and wherein the colors and patterns are displayed in at least one of a stoplight-type indicator, a window border and a background.

* * * * *